(12) United States Patent
Bryan

(10) Patent No.: US 7,568,867 B2
(45) Date of Patent: Aug. 4, 2009

(54) AIR DRIVEN SPINDLE ASSEMBLY

(76) Inventor: Steve M. Bryan, 345 Commerce Dr., Huntington, IN (US) 46750

( * ) Notice: Subject to any disclaimer, the term of this patent is extended or adjusted under 35 U.S.C. 154(b) by 66 days.

(21) Appl. No.: 11/874,396

(22) Filed: Oct. 18, 2007

(65) Prior Publication Data
US 2008/0093094 A1   Apr. 24, 2008

Related U.S. Application Data

(60) Provisional application No. 60/829,922, filed on Oct. 18, 2006.

(51) Int. Cl.
*B23C 1/00* (2006.01)
(52) U.S. Cl. .......... 409/230; 409/231; 408/702; 137/56; 415/25; 415/36; 415/904; 418/43
(58) Field of Classification Search ........ 409/231, 409/232, 230, 144; 408/124, 702; 173/218, 173/221; 137/56, 57, 53; 418/43, 41, 40; 415/25, 36, 903, 904
See application file for complete search history.

(56) References Cited

U.S. PATENT DOCUMENTS

| | | | |
|---|---|---|---|
| 2,402,972 A * | 7/1946 | Mitchell ............ 137/56 |
| 3,119,304 A * | 1/1964 | Doeden ............ 409/144 |
| 3,785,442 A | 1/1974 | Amtsberg et al. |
| 4,797,074 A * | 1/1989 | Albert ............ 418/41 |
| 5,020,968 A | 6/1991 | Yamada et al. |
| 5,567,094 A | 10/1996 | Chung |
| 5,700,115 A * | 12/1997 | Chikamori et al. ...... 408/126 |
| 6,840,723 B2 | 1/2005 | Jacobsson |
| 6,939,094 B2 | 9/2005 | Konishi |
| 7,360,976 B2 * | 4/2008 | Bryan ............ 409/230 |
| 2005/0265821 A1 | 12/2005 | Elsmark |
| 2006/0204357 A1 | 9/2006 | Evans et al. |
| 2008/0146425 A1* | 6/2008 | Bryan ............ 483/1 |

FOREIGN PATENT DOCUMENTS

JP    59-042230 A  *  3/1984
RU      2096104       1/1993

* cited by examiner

*Primary Examiner*—Erica E Cadugan
(74) *Attorney, Agent, or Firm*—Taylor & Aust, P.C.

(57) ABSTRACT

An air driven tool for use in a machining center, the air driven tool including an adjustable speed regulator and a turbine. The turbine is driven by pressurized air directed thereto. The turbine is rotatable about an axis. A flow of the air is regulated by the adjustable speed regulator. The adjustable speed regulator includes a biasing member, an inclined annular surface, a regulator plate and a plurality of moveable bearings. The inclined annular surface has an angle relative to the axis. The plurality of movable bearings are positioned between the inclined annular surface and the regulator plate. The biasing member biases the inclined annular surface and/or the regulator plate toward each other.

20 Claims, 5 Drawing Sheets

AIR DRIVEN SPINDLE ASSEMBLY

CROSS REFERENCE TO RELATED APPLICATIONS

This is a non-provisional application based upon U.S. provisional patent application Ser. No. 60/829,922, entitled "AIR DRIVEN SPINDLE ASSEMBLY", filed Oct. 18, 2006, which is incorporated herein by reference.

BACKGROUND OF THE INVENTION

1. Field of the Invention

The present invention relates to a machining center, and, more particularly, to an air driven spindle assembly insertable into a machining center.

2. Description of the Related Art

The abbreviation "CNC" stands for computer numerical control, and refers specifically to a computer "controller" that reads coded instructions and uses them to direct the driving of a machine tool. The machine tool may be a powered mechanical device used to fabricate components by the selective removal of material. A CNC machine may use interpolation of a cutting tool in the working envelope of the machine. The operating parameters of the CNC can be altered by way of software updates and instructions.

The CNC machines were preceded by NC (Numerically Controlled) machines, which were hardwired and their operating parameters were inflexible. NC machines were developed in the late 1940s and early 1950s. The first CNC systems used NC style hardware, and the computer was used for tool compensation calculations and sometimes for editing of the coded instructions.

Punched tape was used by some NC machines and continued to be used as a medium for transferring coded instructions into the controller for many years after 1950, until it was superseded by RS-232 communication schemes, floppy disks, and now networked systems.

The introduction of CNC machines radically changed the machining industry. Complex curves are as easy to cut as straight lines, complex 3-D structures are relatively easy to produce, and the number of machining steps that required human action have been dramatically reduced.

The increased automation of manufacturing processes with CNC machining, have yielded considerable improvements in the consistency and quality of the parts machined thereby. In a production environment, a series of CNC machines may be combined into one station, commonly called a "cell", to progressively machine a part requiring several operations. CNC machines today are controlled directly from files created by CAD/CAM software packages, so that a part or assembly can go directly from design to manufacturing without the need of producing a paper drawing of the manufactured component. The CNC machines represent a special segment of industrial robot systems, as they are programmable to perform many kinds of machining operations within their designed physical limits. CNC machines are often run over night and over weekends without operator intervention. Error detection features have been developed, allowing CNC machines to telephone the operator if it detects an error such as a broken tool.

It is known to insert externally powered tools into a CNC machine spindle. An externally powered tool is inserted into the head of the CNC machine, with the CNC machine providing positional coordination of the externally powered tool for cutting or other purposes. The externally powered tool receives power from a source other than the rotation of the spindle of the CNC.

Externally powered tools, such as an air driven turbine put out an extremely high-speed rotation for rotating a cutting tool, which may be beyond the capability of the CNC machine spindle head. Further, the externally powered tool may expend less energy for rotation of cutter tool than the rotation of the entire CNC machine tool spindle.

What is needed in the art is an effective, easy to adjust speed regulation system for an air driven tool.

SUMMARY OF THE INVENTION

The present invention provides a regulating apparatus for an air driven spindle for use in a CNC machine.

The invention in one form is directed to an air driven tool for use in a machining center, the air driven tool including an adjustable speed regulator and a turbine. The turbine is driven by pressurized air directed thereto. The turbine is rotatable about an axis. The adjustable speed regulator regulates a flow of the air. The adjustable speed regulator includes a biasing member, an inclined annular surface, a regulator plate and a plurality of moveable bearings. The inclined annular surface has an angle relative to the axis. The plurality of movable bearings are positioned between the inclined annular surface and the regulator plate. The biasing member biases the inclined annular surface and/or the regulator plate toward each other.

An advantage of the present invention is that the speed is governed by an internal adjustable mechanism of the spindle assembly.

Another advantage of the present invention is that the adjustment of the speed is easily accomplished by pressing a button and rotating a portion of the spindle assembly.

BRIEF DESCRIPTION OF THE DRAWINGS

The above-mentioned and other features and advantages of this invention, and the manner of attaining them, will become more apparent and the invention will be better understood by reference to the following description of an embodiments of the invention taken in conjunction with the accompanying drawings, wherein.

Corresponding reference characters indicate corresponding parts throughout the several views. The exemplification set out herein illustrates one embodiment of the invention, in one form, and such exemplification is not to be construed as limiting the scope of the invention in any manner.

DETAILED DESCRIPTION OF THE INVENTION

Figure 1:
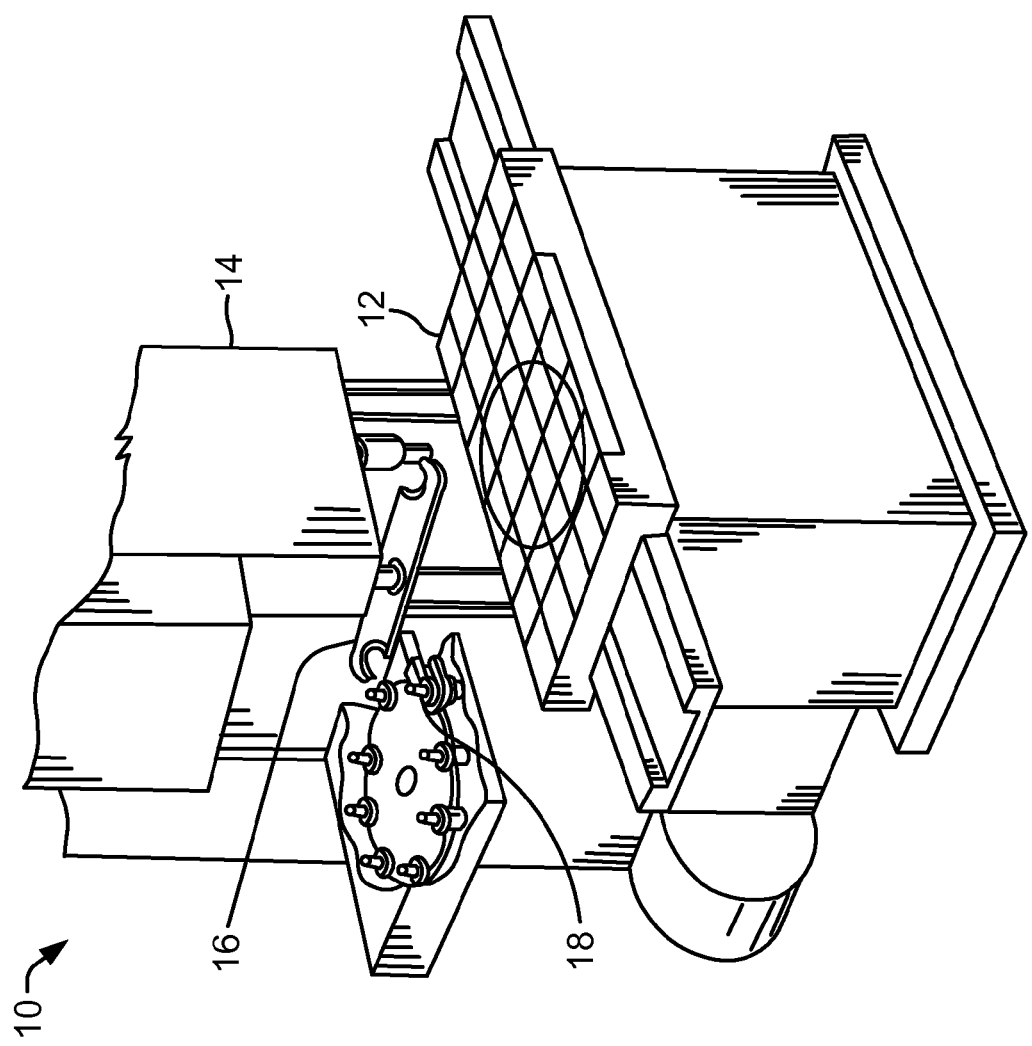
FIG. 1 is a perspective view of a machine center utilizing an embodiment of an air driven spindle of the present invention.
Figure 2:
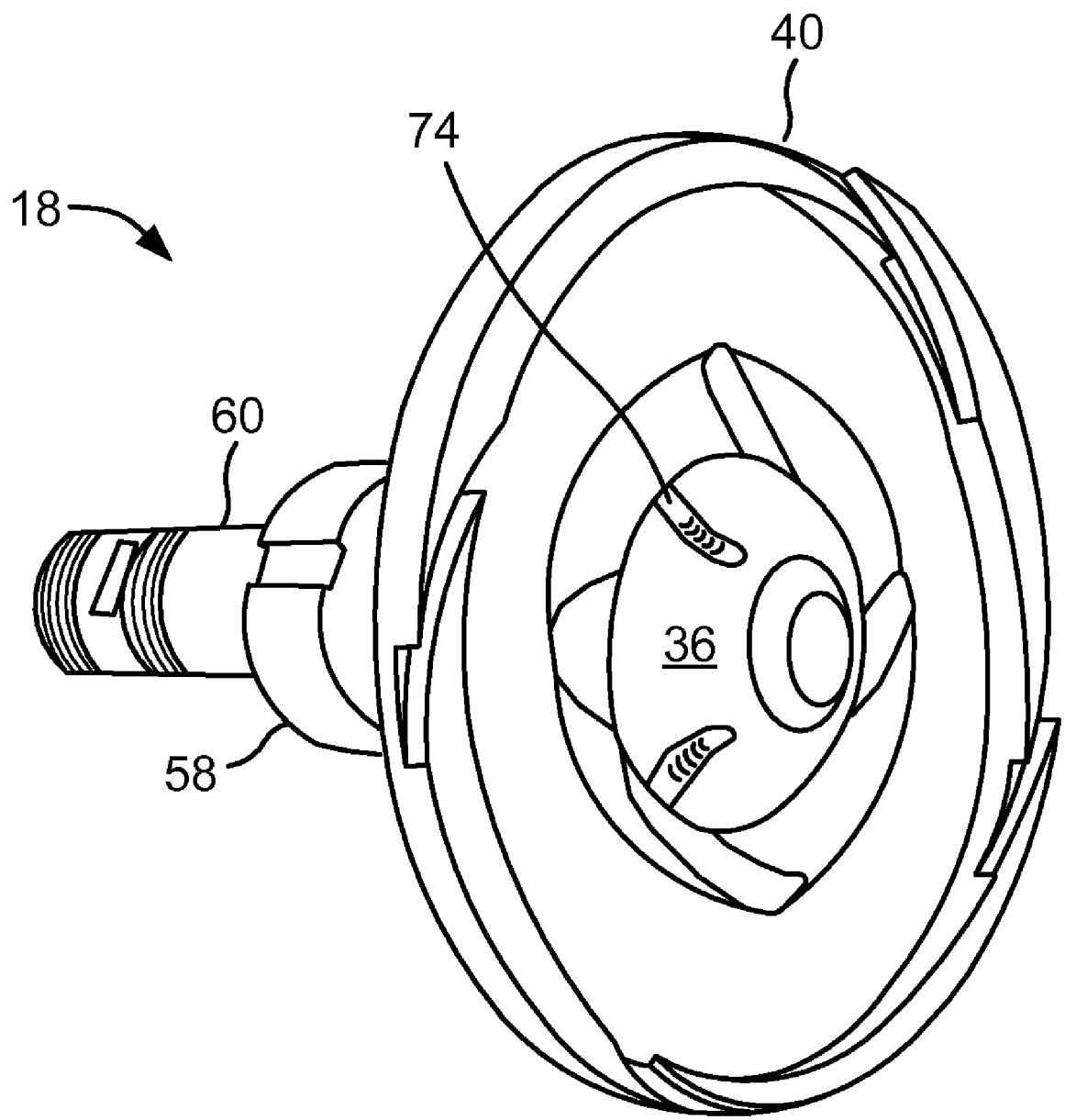
FIG. 2 is a perspective view of a partially disassembled air driven spindle used by the machine center of FIG. 1.
Figure 3:
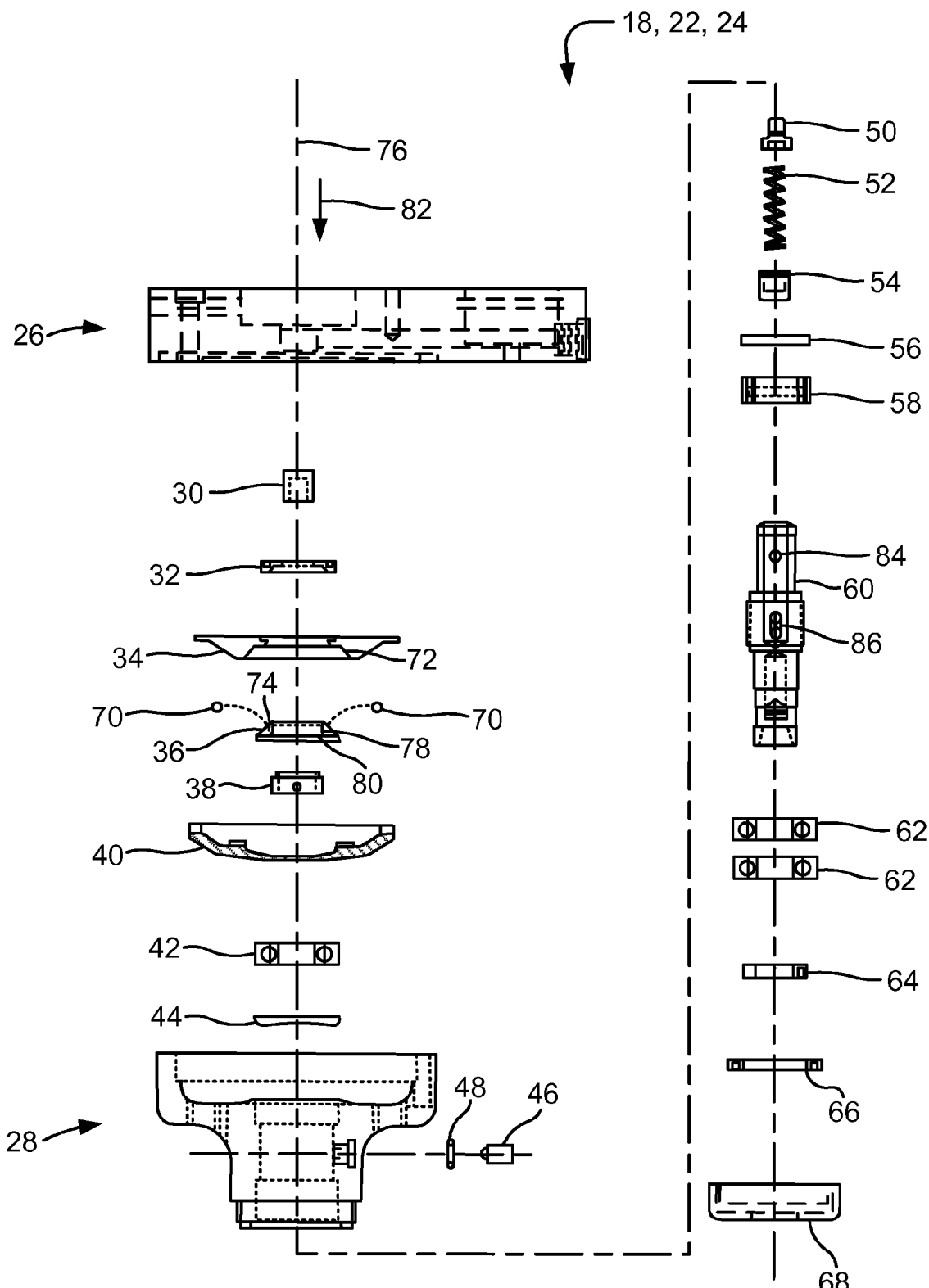
FIG. 3 is a side exploded view of the air driven spindle assembly of FIGS. 1 and 2.

Referring now to the drawings, and more particularly to FIG. 1, there is shown a machining center 10 having a table 12, a head 14, a tool changer 16 and at least one air driven spindle assembly 18. Machining center 10 is also known as a computer numerically controlled (CNC) machine center 10 that has a power driven head 14 that rotates a tool for cutting material fastened to table 12. Tool changer 16 automatically changes tools that are used in head 14 of machine center 10.

An air driven spindle assembly 18 may be utilized in head 14, which is normally not rotated in head 14 but rather is driven by an air supply provided by machine center 10 for the driving of a cutting tool that may be attached to air driven spindle assembly 18.

Now, additionally referring to FIGS. 2-5 there is illustrated air driven spindle assembly 18 that includes an air connection assembly 20, an air turbine assembly 22 and an adjustable speed regulator assembly 24. The air turbine assembly incorporates the air speed regulator assembly 24 to provide an integrally assembled air rotational speed regulation of air driven spindle assembly 18. Air connection assembly 20 provides for air to be supplied to air turbine assembly 22.

Air driven spindle assembly 18 includes a housing 26 and a housing 28 between which air turbine assembly 22 and components of air speed regulator 24 are positioned. Air driven spindle 18 additionally includes an inlet seal 30, a rotor nut 32, an upper rotor portion 34, a regulator plate 36, a valve 38, a lower rotor portion 40, bearing 42, a spring weir 44, an engagement pin 46, an o-ring 48, a spring retainer 50, a spring 52, a spring retainer 54, a regulator pin 56, an adjustment nut 58, a spindle 60, bearings 62, a spindle bearing nut 64, a bearing nut 66 and an end cap 68. Rotor nut 32 is threadingly engaged to spindle 60 holding upper rotor portion 34 in position. Upper rotor portion 34 includes an inclined annular surface 72 having a surface substantially similar to the annular angled or inclined surface of regulator plate 36. Annular angled surface 72 of upper rotor portion 34 is inclined at an angle to a rotational axis 76. Regulator plate 36 includes grooves 74 in which spheres 70 in the form of ball bearings 70 are placed. Grooves 74 have a portion 78 that is substantially parallel to axis 76 and a portion 80 that is substantially perpendicular or normal to axis 76.

As air driven spindle assembly is supplied air and comes up to speed, ball bearings 70 move along annular angled surface 72 yet are retained in grooves 74 and cause regulator plate 36 to move in a direction 82 for valve 38 to move to block a portion of the air coming through hole 84. Air that is supplied by way of air connection assembly 20 passes into the hollow center of spindle 60 also known as a shaft 60. And the air that escapes through hole 84 powers air turbine assembly 22 causing it to rotate. As valve 38 shuts off part of the airflow through hole 84 the speed decreases to thereby regulate the speed. Countering the centrifugal force that causes ball bearings 70 to move radially outward along inclined annular surface 72 is spring 52 that provides a biasing force to move regulator plate 36 and valve 38 away from hole 84 allowing a greater airflow therethrough. Spring 52 is retained in retainers 50 and 54 to uniformly provide a biasing force to regulator plate 36. Pin 56 extends through slotted hole 86 of spindle 60 against which spring retainer 54 rests. Adjustment nut 58 is threadingly engaged with spindle 60 and as adjustment nut 58 is positioned it causes pin 56 to be moved in an axial direction along axis 76. When adjustment nut 58 is moved towards spring 52 it increases the biasing force of spring 52 against regulator plate 36 this causes speed regulator assembly 24 to allow a higher speed for air turbine assembly 22. Adjustment nut 58 is positioned inside of housing 28 and engagement pin 46 is pressed in to engage a notch in adjustment nut 58 to hold it in position as air turbine assembly 22 is rotated by hand to allow for the adjustment of the speed by way of the adjusting of the biasing force on spring 52. Pin 56 moves in a machined channel in adjusting nut 58 as adjusting nut 58 is rotated relative to spindle 60, and adjusting nut 58 may have scalloped grooves to accommodate the diameter of pin 56 to thereby provide an indexing type function as adjustment nut 58 is rotated. Since pin 56 is located in grooved hole 86 the biasing force of spring 52 causes pin 56 to be settled along the internal surface of adjusting nut 58 having the scalloped surface to accommodate the diameter of pin 56 and to act as a detented adjustment.

As ball bearings 70 are held in groove 74 by the biasing force of spring 52, when spindle assembly 18 is not operating, bearings 70 are moved in a direction opposite direction 82 with ball bearing 70 being positioned along surface 78. As the speed of spindle assembly 18 increases ball bearings 70 move along annular inclined or angled surface 72 of upper rotor portion 34 and come into contact with surface 80 of regulator plate 36. By thus moving to overcome the biasing force of spring 52 valve 38 is adjusted relative to hole 84 thereby controlling the airflow that passes through the turbine section to thereby regulate the rotational speed of the spindle assembly. The location of ball bearings 70 is radially farther away from axis 76 as the speed is increased.

Adjusting nut 58 may have a groove to accommodate the insertion of pin 56 therein and an annular groove for the rotation of adjustment nut 58 about pin 56. Multiple notches around the outside of adjustment 58 may be included to rapidly allow pin 46 to engage one of the notches around adjustable nut 58 to hold nut 58 so that it cannot rotate as the spindle assembly, which has a portion extending out of housing 28 that is turned by the user so that the user can easily feel the detented positions as pin 56 moves over scallops in nut 58.

Figure 4:
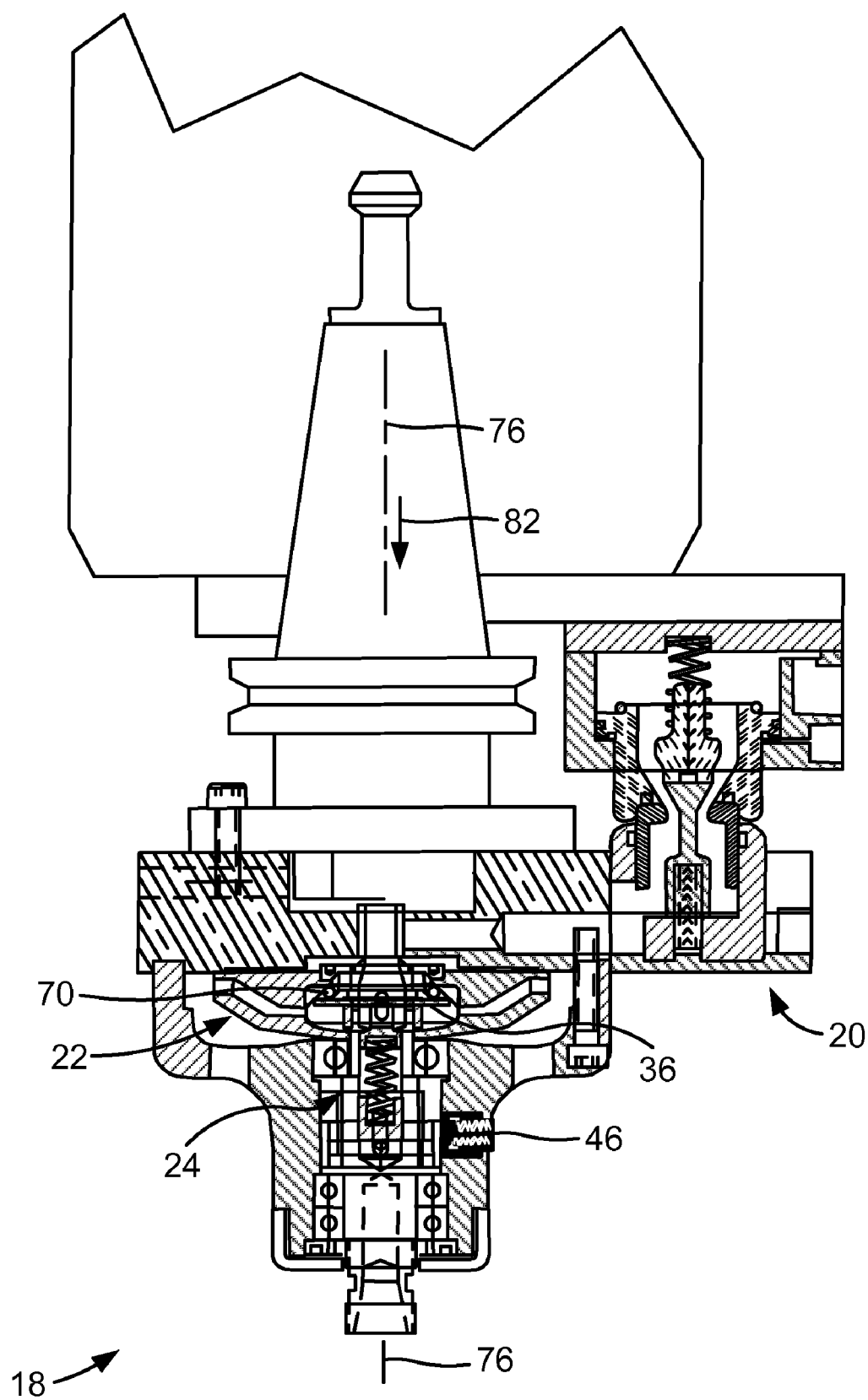
FIG. 4 is a partially cross-sectioned view of the air driven spindle assembly of FIGS. 1-3.
Figure 5:
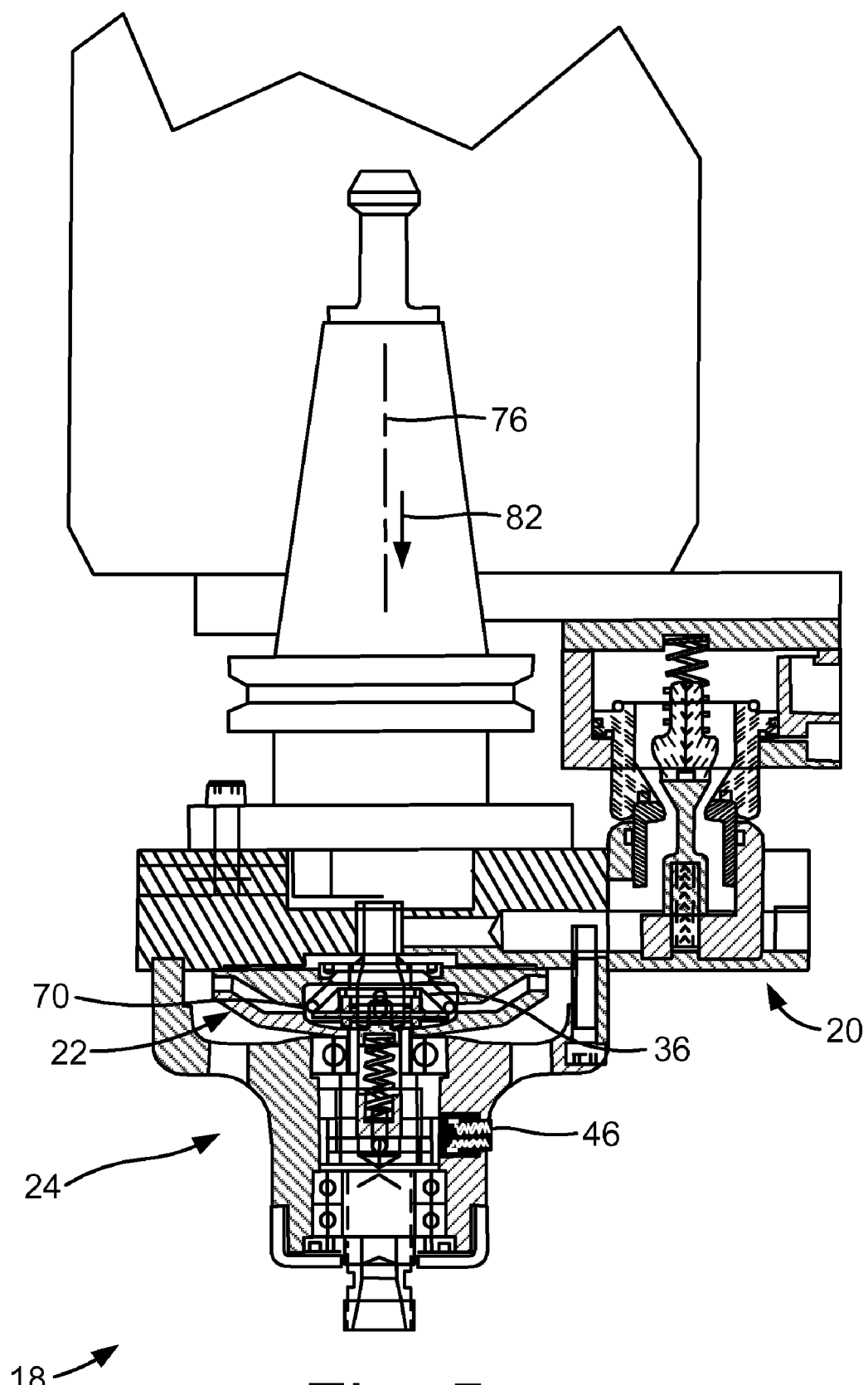
FIG. 5 is another partially sectioned side view of the spindle assembly of FIGS. 1-4.

FIG. 4 illustrates the ball bearings being radially closer to axis 76 than in FIG. 5. FIG. 5 also showing the regulator plate being moved in direction 82 from that shown in FIG. 4.

An advantage of the present invention is that it is easily adjustable having the regulating system entirely internal so that the spindle assembly itself regulating the speed of the spindle rather than requiring an external regulating device.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An air driven tool for use in a machining center, the air driven tool, comprising:
   an adjustable speed regulator; and
   a turbine driven by pressurized air directed thereto, said turbine being rotatable about an axis, a flow of the air being regulated by said adjustable speed regulator;
   a shaft aligned with said axis and having a hollow portion with air flowing therein, said shaft having at least one hole through a side wall of said shaft and connected to said hollow portion;
   said adjustable speed regulator including:
      a biasing member;
      an inclined annular surface being at an angle relative to said axis;
      a regulator plate;
      a plurality of movable bearings positioned between said inclined annular surface and said regulator plate, said biasing member biasing at least one of said inclined annular surface and said regulator plate toward each other; and
      a valve sleeve slidable along said shaft to selectively cover at least a portion of said at least one hole.

2. The air driven tool of claim 1, wherein said plurality of movable bearings move from a first position to a second position along said inclined annular surface as a rotational speed of said turbine increases, said second position being radially farther away from said axis than said first position.

3. The air driven tool of claim 2, wherein said regulator plate includes a plurality of grooves, a corresponding one of said plurality of movable bearings being positioned in each of said plurality of grooves.

4. The air driven tool of claim 3, wherein said plurality of movable bearings are ball bearings.

5. The air driven tool of claim 4, wherein said plurality of grooves includes a portion that is substantially parallel to said axis and a portion that is substantially normal to said axis.

6. The air driven tool of claim 1, further comprising a threaded member substantially centered about said axis, said biasing member having an end directed toward said regulator plate and an other end that is directed toward said threaded member, said other end being positioned dependent on a position of said threaded member.

7. The air driven tool of claim 6, wherein said regulator plate is configured to move in an axial direction toward said threaded member as a rotational speed of said turbine increases.

8. The air driven tool of claim 7, wherein said shaft has a threaded portion that engages said threaded member.

9. The air driven tool of claim 8, wherein said regulator plate comprises an angled member having a surface substantially parallel to said inclined annular surface, said angled member being axially slidable along said shaft;

and wherein said valve sleeve is connected to said angled member.

10. The air driven tool of claim 9, wherein said plurality of movable bearings move from a first position to a second position along said inclined annular surface as said rotational speed of said turbine increases, said second position being radially farther away from said axis than said first position, said angled member including a plurality of grooves each including a corresponding one of said plurality of movable bearings.

11. A machining center, comprising:
a tool head; and
an air driven tool attachable to said tool head, said air driven tool including:
an adjustable speed regulator; and
a turbine driven by pressurized air directed thereto, said turbine being rotatable about an axis, a flow of the air being regulated by said adjustable speed regulator;
a shaft aligned with said axis and having a hollow portion with air flowing therein, said shaft having at least one hole through a side wall of said shaft and connected to said hollow portion;
said adjustable speed regulator including:
a biasing member;
an inclined annular surface being at an angle relative to said axis;
a regulator plate;
a plurality of movable bearings positioned between said inclined annular surface and said regulator plate, said biasing member biasing at least one of said inclined annular surface and said regulator plate toward each other;
a valve sleeve slidable along said shaft to selectively cover at least a portion of said at least one hole.

12. The machining center of claim 11, wherein said plurality of movable bearings move from a first position to a second position along said inclined annular surface as a rotational speed of said turbine increases, said second position being radially farther away from said axis than said first position.

13. The machining center of claim 12, wherein said regulator plate includes a plurality of grooves, each of said plurality of grooves having a corresponding one of said plurality of movable bearings positioned therein.

14. The machining center of claim 13, wherein said plurality of movable bearings are ball bearings.

15. The machining center of claim 14, wherein said plurality of grooves includes a portion that is substantially parallel to said axis and a portion that is substantially normal to said axis.

16. The machining center of claim 11, said adjustable speed regulator further comprising a threaded member substantially centered about said axis, said biasing member having an end directed toward said regulator plate and an other end that is directed toward said threaded member, said other end being positioned dependent on a position of said threaded member.

17. The machining center of claim 16, wherein said regulator plate is configured to move in an axial direction toward said threaded member as a rotational speed of said turbine increases.

18. The machining center of claim 17, wherein said shaft has a threaded portion that engages said threaded member.

19. The machining center of claim 18, wherein said regulator plate comprises an angled member having a surface substantially parallel to said inclined annular surface, said angled member being axially slidable along said shaft;

and wherein said valve sleeve is connected to said angled member.

20. The machining center of claim 19, wherein said plurality of movable bearings move from a first position to a second position along said inclined annular surface as said rotational speed of said turbine increases, said second position being radially farther away from said axis than said first position, said angled member including a plurality of grooves each including a corresponding one of said plurality of movable bearings.

* * * * *